United States Patent
Sakamoto et al.

(10) Patent No.: US 7,441,258 B2
(45) Date of Patent: Oct. 21, 2008

(54) OBJECTIVE LENS DRIVE DEVICE AND OPTICAL HEAD DEVICE

(75) Inventors: Manabu Sakamoto, Nagano (JP); Tsuyoshi Yokouchi, Nagano (JP)

(73) Assignee: NIDEC Sankyo Corporation, Nagano (JP)

( * ) Notice: Subject to any disclaimer, the term of this patent is extended or adjusted under 35 U.S.C. 154(b) by 669 days.

(21) Appl. No.: 11/074,195

(22) Filed: Mar. 7, 2005

(65) Prior Publication Data

US 2005/0195704 A1   Sep. 8, 2005

(30) Foreign Application Priority Data

Mar. 8, 2004   (JP)   ............... 2004-064525

(51) Int. Cl.
*G11B 7/00* (2006.01)
*G11B 7/085* (2006.01)

(52) U.S. Cl. .................. 720/683; 369/44.15
(58) Field of Classification Search ............... 720/683, 720/686; 369/44.11, 44.15, 44.32
See application file for complete search history.

(56) References Cited

U.S. PATENT DOCUMENTS

| | | | | |
|---|---|---|---|---|
| 4,269,486 A * | 5/1981 | Shintani | ............... | 359/226 |
| 4,759,005 A * | 7/1988 | Kasahara | ............... | 369/44.21 |
| 5,949,590 A * | 9/1999 | Hong | ............... | 359/814 |
| 6,278,669 B1 * | 8/2001 | Anzai et al. | ............... | 369/44.14 |
| 6,343,053 B1 * | 1/2002 | Akanuma et al. | ............... | 369/44.14 |
| 7,054,236 B2 * | 5/2006 | Kawano | ............... | 369/44.16 |
| 7,272,840 B2 * | 9/2007 | Cheong et al. | ............... | 720/683 |
| 2002/0136145 A1 * | 9/2002 | Smulders et al. | ............... | 369/112.23 |
| 2003/0218963 A1 * | 11/2003 | Takeshita et al. | ............... | 369/244 |
| 2004/0022168 A1 * | 2/2004 | Kawano et al. | ............... | 369/244 |
| 2004/0130978 A1 * | 7/2004 | Hatazawa | ............... | 369/44.22 |
| 2004/0264310 A1 * | 12/2004 | Hayashi | ............... | 369/44.14 |
| 2005/0041540 A1 * | 2/2005 | Tanaka | ............... | 369/44.15 |
| 2005/0117469 A1 * | 6/2005 | Song et al. | ............... | 369/44.15 |
| 2005/0141360 A1 * | 6/2005 | Han | ............... | 369/44.15 |
| 2005/0185530 A1 * | 8/2005 | Akanuma | ............... | 369/44.15 |
| 2005/0185531 A1 * | 8/2005 | Jang et al. | ............... | 369/44.22 |

FOREIGN PATENT DOCUMENTS

JP   2003-045720   2/2003

* cited by examiner

*Primary Examiner*—Brian E Miller
(74) *Attorney, Agent, or Firm*—Reed Smith LLP

(57) ABSTRACT

An objective lens drive device includes a drive mechanism for driving a lens holder at least in a focusing direction and a tracking direction. The drive mechanism includes a drive magnet provided with a magnetized opposing face in which different magnetic poles are disposed to be adjacent to each other via a magnetic pole boundary portion formed in a roughly U-shape. The drive mechanism also includes a tilt drive coil for driving the lens holder in a tilt direction and the tilt drive coil is opposedly disposed to the magnetized opposing face at a position where the tilt drive coil overlaps with at least a focusing drive coil or a tracking drive coil in a direction in which the focusing drive coil and the tracking drive coil face the magnetized opposing face.

16 Claims, 5 Drawing Sheets

(A)

(B)

OBJECTIVE LENS DRIVE DEVICE AND OPTICAL HEAD DEVICE

CROSS-REFERENCE TO RELATED APPLICATIONS

This application claims priority to Japanese Application No. 2004-64525 filed Mar. 8, 2004, which is incorporated herein by reference.

FIELD OF THE INVENTION

The present invention relates to a wire suspension type of objective lens drive device and an optical head device provided with the objective lens drive device.

BACKGROUND OF THE INVENTION

An optical head device that is used for recording or reproducing information into or from an optical recording disk such as a CD or a DVD is provided with a wire suspension type of objective lens drive device has been known in the art. The wire suspension type of objective lens drive device includes an objective lens, a lens holder which holds the objective lens, a fixed side member which supports the lens holder with a plurality of wires in a movable manner, and a drive mechanism for driving the lens holder at least in a focusing direction and in a tracking direction.

The objective lens drive device used for this type of optical head device is a two-axes driven objective lens drive device has been known in the art. The two axes driven objective lens drive device has a drive mechanism for driving the lens holder in the focusing direction and the tracking direction is constructed by means of a pair of drive magnets having a magnetized opposing face and a focusing drive coil and a tracking drive coil oppsedly disposed to the magnetized opposing face of the drive magnet. The drive magnet is provided with different magnetic poles whose boundary portions are formed in a U-shape. Each of the focusing drive coil and the tracking drive coil is disposed so as to extend over both the different magnetic poles across the boundary portion. (For example, see Japanese Patent Laid-Open No. 2003-45720). In the conventional objective lens drive device described above, the focusing drive coil and the tracking drive coil are formed on a printed coil circuit board.

However, the conventional objective lens drive device described above is not provided with a tilt drive mechanism. In other words, a tilt drive mechanism is not applied to the objective lens drive device. The conventional objective lens drive device is instead provided with the drive magnet having the magnetized opposing face in which the different magnetic poles are polarized and magnetized with the boundary portion in the U-shape.

On the other hand, in the industry, high-speed recording and reproduction has been required in the optical head device. In order to cope with the demand for high speed recording and reproduction, the objective lens drive device is required to be constructed such that a servo frequency for driving the objective lens in the focusing, tracking or tilt direction to control the position of the objective lens is increased to execute positional control of the objective lens at a higher frequency in the respective directions.

In the case that the servo frequency is increased at a higher value, resonance may occur in the objective lens drive device when the servo frequency approaches a high-order resonance frequency in the objective lens drive device. Therefore, when the high-order resonance frequency is low, it is difficult to control the objective lens at a high speed in the focusing direction, the tracking direction or in the tilt direction. Accordingly, in order to cope with a high-speed operation, the high-order resonance frequency is required to be higher.

SUMMARY OF THE INVENTION

In view of the problems described above, it is an object and advantage of the present invention to provide an objective lens drive device which uses a drive magnet provided with a magnetized opposing face in which different magnetic poles are disposed to be adjacent to each other via a magnetic pole boundary portion formed in a roughly U-shape and which is provided with a tilt function and is capable of performing a high speed operation.

In order to achieve the above object and advantage, according to an embodiment of the present invention, there is provided an objective lens drive device including an objective lens, a lens holder which holds the objective lens, a fixed side member which supports the lens holder with a plurality of wires in a movable manner, and a drive mechanism for driving the lens holder at least in a focusing direction and a tracking direction. The drive mechanism includes a drive magnet provided with a magnetized opposing face in which different magnetic poles are disposed to be adjacent to each other via a magnetic pole boundary portion formed in a roughly U-shape, a focusing drive coil and a tracking drive coil which are opposedly disposed to the magnetized opposing face so as to extend over the magnetic pole boundary portion, and a tilt drive coil for driving the lens holder in a tilt direction. The tilt drive coil is opposedly disposed to the magnetized opposing face at a position where the tilt drive coil overlaps with at least either one of the focusing drive coil and the tracking drive coil in a direction in which the focusing drive coil and the tracking drive coil face the magnetized opposing face.

According to the embodiment of the present invention, the drive mechanism is provided with the tilt drive coil. The tilt drive coil faces the magnetized opposing face of the drive magnet and thus the tilt driving is capable of using one common drive magnet. Especially, the tilt drive coil is opposedly disposed to the magnetized opposing face of the common drive magnet at a position where the tilt drive coil overlaps with at least either one of the focusing drive coil and the tracking drive coil in a direction in which the focusing drive coil and the tracking drive coil face the magnetized opposing face. Therefore, the respective drive coils are concentratedly disposed in the focusing direction and the tracking direction. Accordingly, the objective lens drive device can be made compact and the rigidity of the device can be enhanced and, as a result, a high-order resonance frequency of the device can be made a higher value.

In accordance with an embodiment of the present invention, the tilt drive coil is formed to be wound around in a roughly rectangular shape and is opposedly disposed to the magnetized opposing face so as to extend over the magnetic pole boundary portion. In this case, two sides of the rectangular shaped coil can be used for tilt driving. Therefore, the sensitivity of the objective lens at the time of tilt driving can be enhanced.

In accordance with an embodiment of the present invention, the focusing drive coil and the tracking drive coil are respectively formed to be wound around in a roughly trapezoidal shape having a oblique side part, and the focusing drive coil and the tracking drive coil are disposed on an approximately the same plane such that both the oblique side parts of the focusing drive coil and the tracking drive coil are adjacent to each other.

When the focusing drive coil and the tracking drive coil are disposed on an approximately the same plane, the concentrated arrangement of these drive coils and the tilt drive coil is enabled in the direction in which the focusing drive coil and the tracking drive coil are opposed to the magnetized opposing face. For example, in the case that the focusing drive coil and the tracking drive coil are wound around in a rectangular shape, when the focusing drive coil and the tracking drive coil are disposed on an approximately the same plane, the respective corner parts of the drive coils may interfere with each other and thus the concentrated arrangement of the focusing drive coil and the tracking drive coil is not attained. However, according to the embodiment of the present invention, the focusing drive coil and the tracking drive coil are respectively formed to be wound around in a roughly trapezoidal shape having an oblique side part. The respective oblique side parts can be disposed to be adjacent to each other and consequently, the drive coils including the tilt drive coil can be further concentratedly disposed.

In accordance with an embodiment of the present invention, the focusing drive coil and the tracking drive coil are respectively formed to be wound around in a roughly trapezoidal shape having a short side part, a long side part and an oblique side part connecting the long side part to the short side part, and the focusing drive coil and the tracking drive coil are disposed on an approximately the same plane such that the long side part of the focusing drive coil becomes perpendicular to the long side part of the tracking drive coil.

In accordance with an embodiment of the present invention, a recessed part is provided on a side face of the lens holder for disposing the tilt drive coil. Since the tilt drive coil is disposed on the recessed part provided on the side face of the lens holder, the focusing drive coil can be easily disposed over the tilt drive coil. Preferably, the recessed part is concaved to be slightly deeper than the thickness of the tilt drive coil.

In this case, it is preferable that the focusing drive coil and the tracking drive coil are respectively formed to be wound around in a roughly trapezoidal shape having a short side part, a long side part and an oblique side part connecting the long side part to the short side part. Therefore, the focusing drive coil and the tracking drive coil can be disposed such that both the oblique side parts are adjacent to each other and both the long side parts are perpendicular to each other and thus the objective lens drive device can be attained which is capable of making small-sized and performing the focusing control and tracking control.

In accordance with an embodiment of the present invention, it is preferable that the recessed part on which the tilt drive coil is disposed is formed on both sides of the base end side face and the tip end side face of the lens holder, and the tilt drive coil, the focusing drive coil and the tracking drive coil are respectively disposed on both the base end side face and the tip end side face of the lens holder. In this case, respective tilt, focusing and tracking controls can be performed at both sides of the lens holder.

In accordance with an embodiment of the present invention, at least one of the focusing drive coil, the tracking drive coil and the tilt drive coil is preferably a wound type of coil. According to the embodiment of the present invention, the occupying volume rate of coil can be enhanced in comparison with the case using a printed coil circuit board on which a drive coil is formed on a printed circuit board. Therefore, a higher driving force can be obtained.

The objective lens drive devices in accordance with the embodiments of the present invention can be applied to an optical head device.

According to the present invention, the tilt drive coil is oppositely disposed to the magnetized opposing face of the common drive magnet at a position where the tilt drive coil overlaps with at least either one of the focusing drive coil and the tracking drive coil in a direction in which the focusing drive coil and the tracking drive coil face the magnetized opposing face. Therefore, the respective drive coils are concentratedly disposed. Accordingly, the objective lens drive device can be made compact and the rigidity of the device can be enhanced. As a result, since the high-order resonance frequency of the device can be made a higher value and thus the objective lens drive device is capable of performing a high speed operation while provided with the tilt function.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 4(A) is the plan view of the lens holder, FIG. 4(B) is an explanatory view when the lens holder is viewed from its base end side, and FIG. 4(C) is an explanatory view when the lens holder is viewed from its tip end side.

DETAILED DESCRIPTION OF THE PREFERRED EMBODIMENTS

An embodiment of the present invention will be described below with reference to the accompanying drawings.

Figure 1:
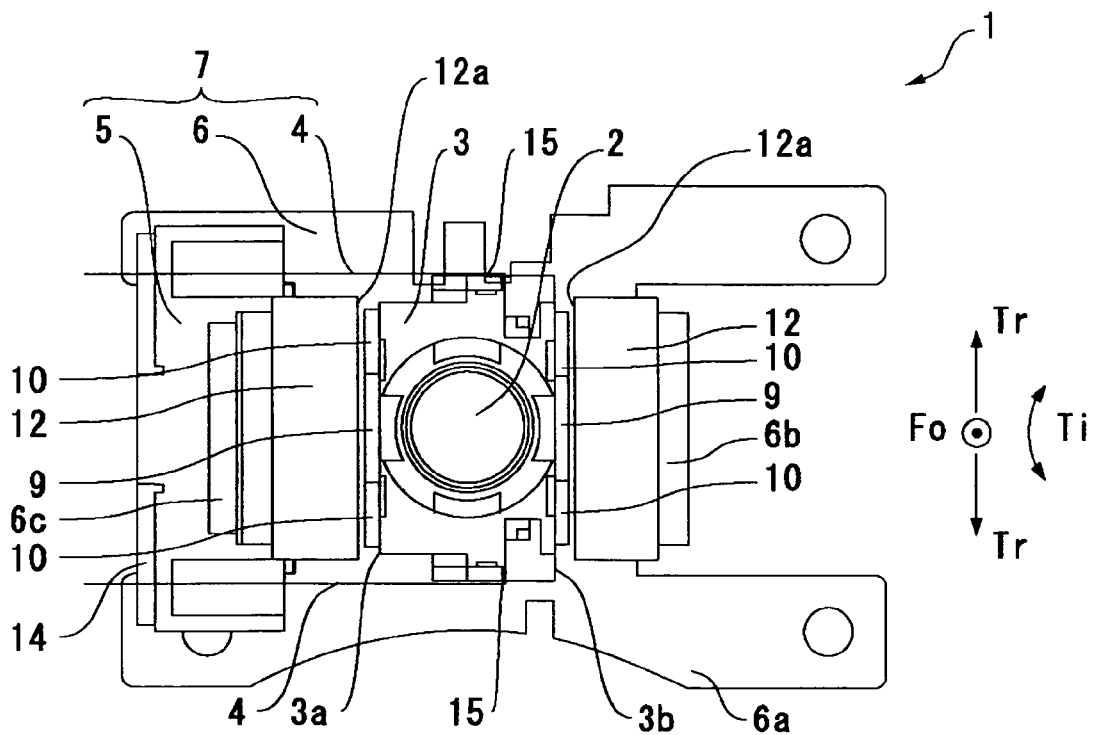
FIG. 1 is a plan view showing an objective lens drive device in accordance with an embodiment of the present invention.
Figure 2:
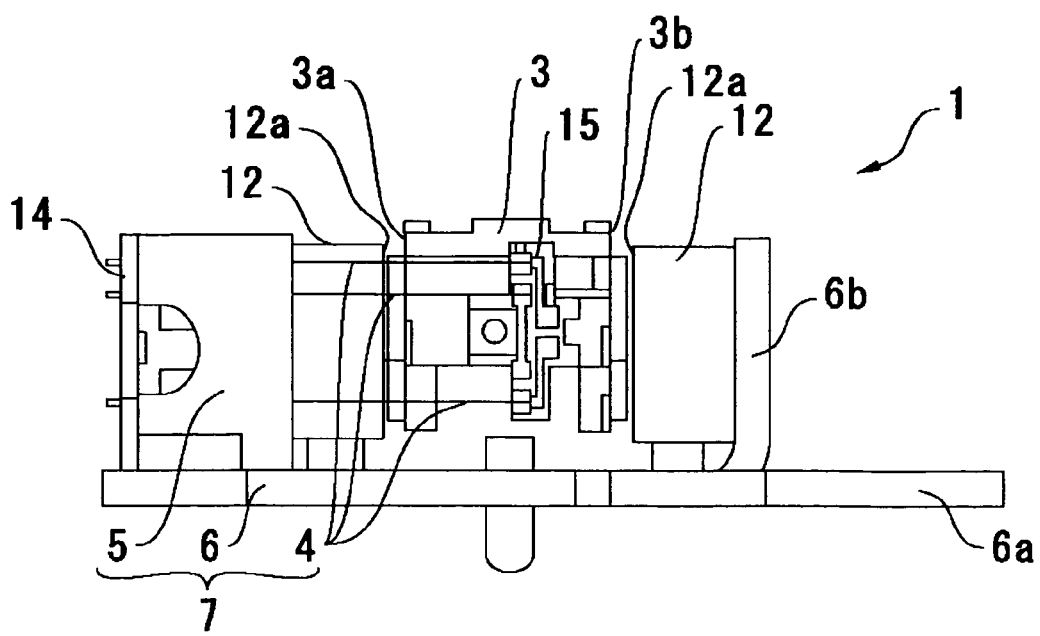
FIG. 2 is the side view of the objective lens drive device shown in FIG. 1.
Figure 3:
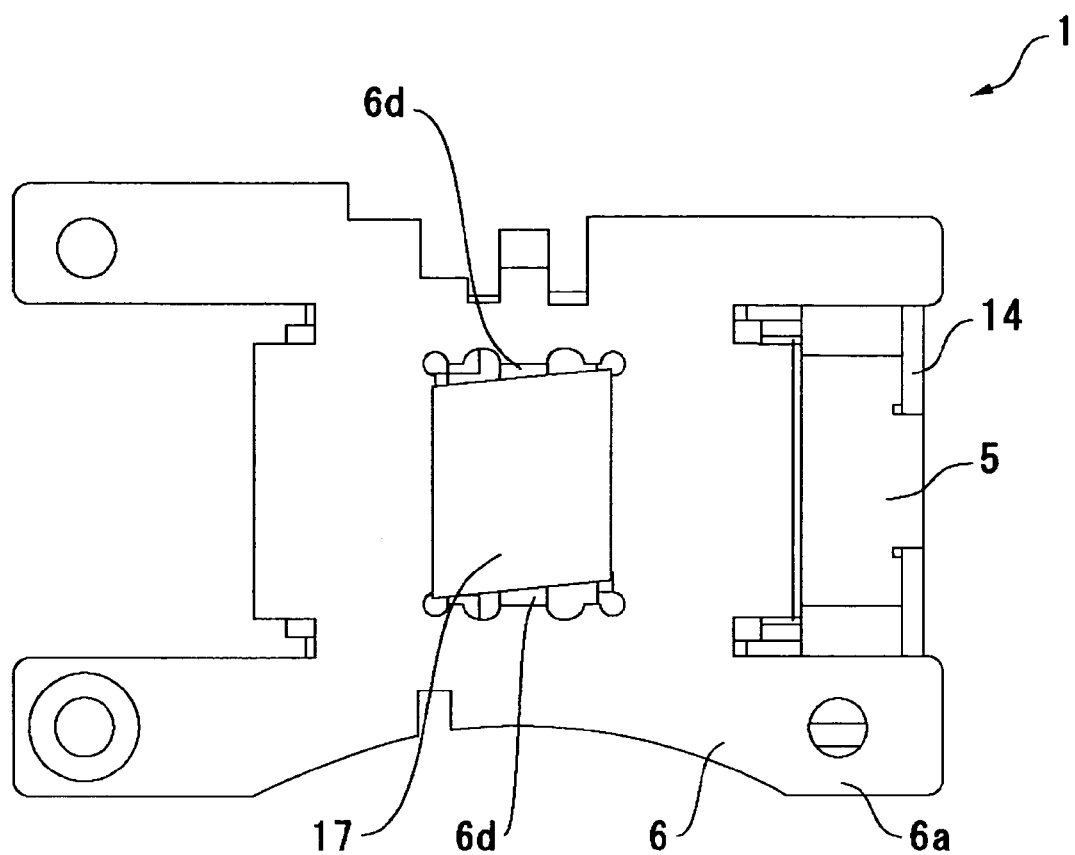
FIG. 3 is the bottom view of the objective lens drive device shown in FIG. 1.
Figure 4:
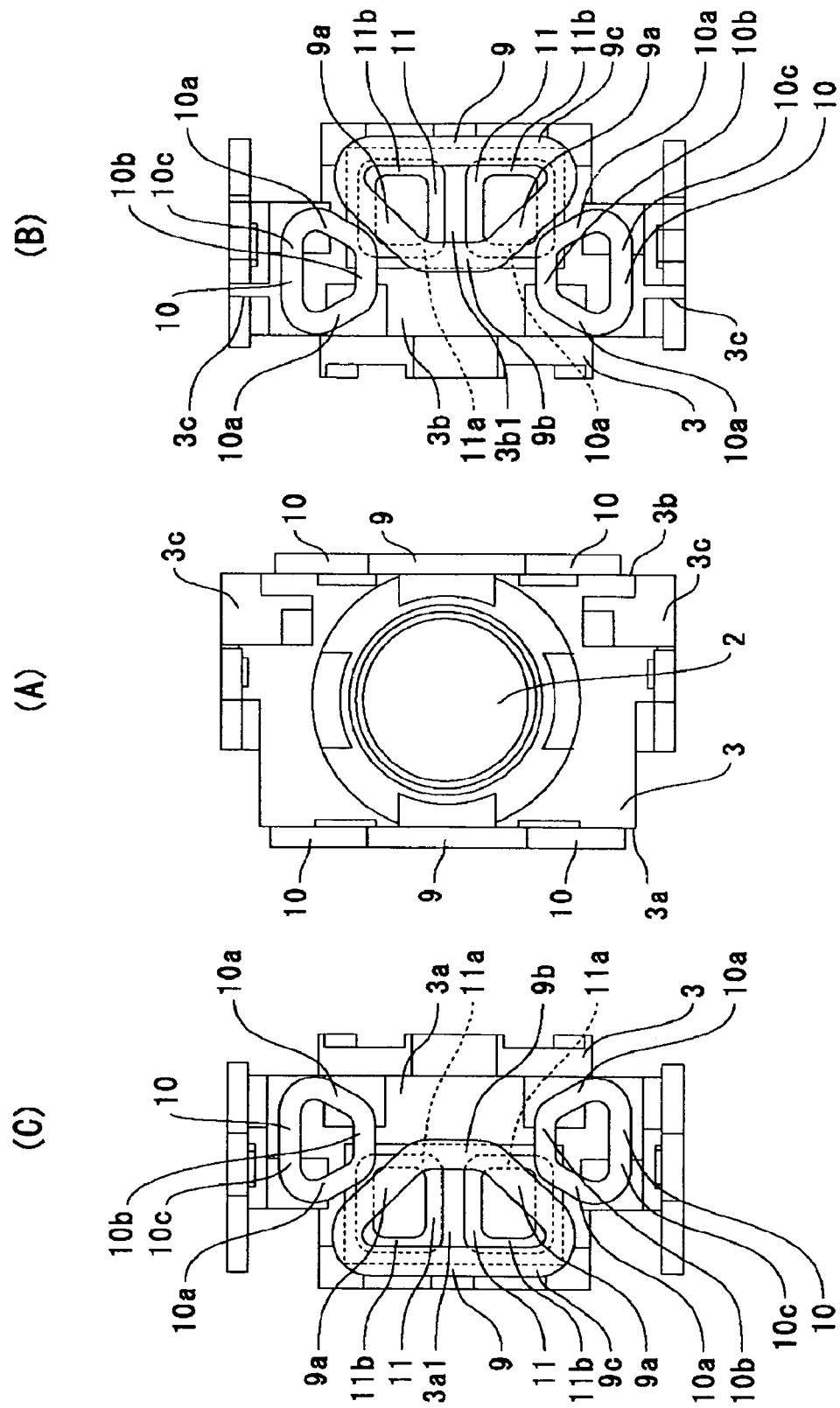
FIGS. 4(A), 4(B) and 4(C) are explanatory views of a lens holder on which an objective lens and respective drive coils are mounted in the objective lens drive device shown in FIG. 1.

FIG. 1 is a plan view showing an objective lens drive device in accordance with an embodiment of the present invention. FIG. 2 is the side view of the objective lens drive device shown in FIG. 1. FIG. 3 is the bottom view of the objective lens drive device shown in FIG. 1. FIGS. 4(A), 4(B) and 4(C) are explanatory views of a lens holder on which an objective lens and respective drive coils are mounted. FIG. 4(A) is the plan view of the lens holder, FIG. 4(B) is an explanatory view when the lens holder is viewed from its base end side, and FIG. 4(C) is an explanatory view when the lens holder is viewed from its tip end side.

An objective lens drive device 1 in accordance with an embodiment of the present invention shown in FIGS. 1 through 4 is used in an optical head device, which is provided with a prescribed optical system, for recording or reproducing information on or from an optical recording disk such as a CD or a DVD. The construction members of the optical head device such as a device frame may utilize well-known components and thus their descriptions are omitted. The objective lens drive device 1 includes an objective lens 2, a lens holder 3 which holds the objective lens 2, a fixed side member 7 which movably supports the lens holder 3 with six wires 4 in a focusing direction (direction shown by the arrow "Fo"), in a tracking direction (direction shown by the arrow "Tr"), and in a tilt direction (direction shown by the arrow "Ti"), and a drive mechanism which drives the lens holder 3 in the focusing direction "Fo", the tracking direction "Tr" and the tilt direction "Ti".

The fixed side member 7 includes six wires 4 which support the lens holder 3 on their tip ends side, a holder support member 5 which supports the wires 4 on their base ends side, and a yoke 6 which constructs the main body frame and also constructs a part of the drive mechanism.

The six wires 4 are also respectively used as a power feeding wire for a focusing drive coil 9, tracking drive coils 10 and tilt drive coils 11, which are described later. Therefore, the tip end sides of the respective wires 4 are soldered and fixed to a pair of relay circuit boards 15, which are fixed on the lens holder 3. The base ends of the wires 4 are respectively soldered on the wiring patterns of a printed circuit board 14 that is mounted on the back face of the holder support member 5.

The yoke 6 includes a bottom face part 6a and holding parts 6b, 6c that hold a pair of drive magnets 12 constructing the drive mechanism described later. The bottom face part 6a is formed of a magnetic steel plate in a roughly rectangular shape and the holding parts 6b, 6c are cut and raised on the short length sides of the bottom face part 6a. A rectangular aperture part is provided at the center portion of the bottom face part 6a and two protruding parts 6d, 6d are formed which protrude on the under surface side in the edge parts of the aperture part. A ¼ wavelength plate 17 constructing the optical system of the optical head device is mounted on the protruding parts 6d, 6d. The holder support member 5 is fixed on the short length side of the bottom face part 6a of the yoke 6 by a fixing means such as an adhesive.

The lens holder 3 includes two side faces perpendicular to the tracking direction "Tr" and two side faces parallel to the tracking direction "Tr" to be formed in a rectangular shape in the plane view. An objective lens 2 is held on the central portion of the lens holder 3. The relay circuit boards 15, 15 described above are fixed on the two side faces of the lens holder 3 perpendicular to the tracking direction "Tr". In the following description, the side face on the holder support member 5 side of the two side faces of the lens holder 3 that is parallel to the tracking direction "Tr" is defined as the base end side face 3a of the lens holder 3 and the other side face is defined as the tip end side face 3b of the lens holder 3.

On the base end side face 3a of the lens holder 3 is concaved a recessed part 3a1 on which the tilt drive coils 11 constructing the drive mechanism described later are disposed. More concretely, the recessed part 3a1 is formed so as to be concaved in a rectangular shape on a lower half portion with an area of roughly half of the base end side face 3a in FIG. 4(C). A recessed part 3b1 is similarly concaved in the tip end side face 3b of the lens holder 3 (see FIG. 4(B)).

On the upper face of the lens holder 3 is formed restricting faces 3c for regulating the movable range of the lens holder 3 in the focusing direction "Fo". In the embodiment of the present invention, two restricting faces 3c, 3c are formed at both end portions in the tracking direction "Tr" of the tip end side face 3b. The restricting faces 3c, 3c abut with, for example, a part of the cover of the objective lens drive device 1 not shown in the drawing to regulate the movable range of the lens holder 3 in the focusing direction "Fo".

Figure 5:
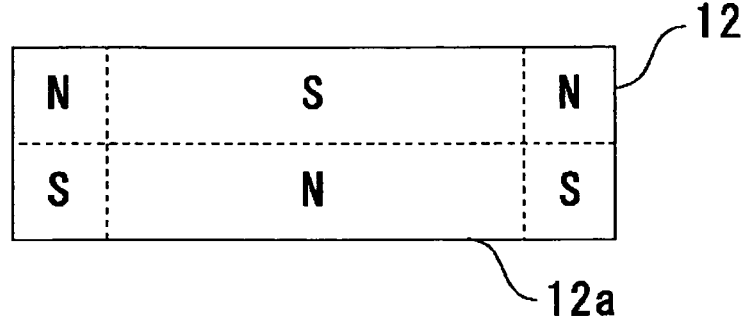
FIG. 5(A) is a plan view showing a drive magnet which is used in the objective lens drive device shown in FIG. 1
FIG. 5(B) is its side view.
Figure 5:
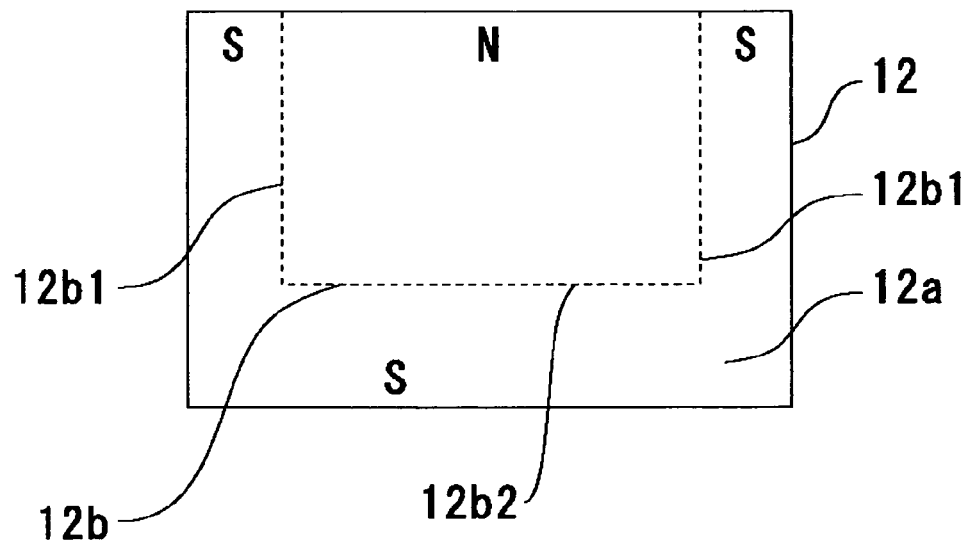

FIG. 5(A) is a plan view showing a drive magnet used in the objective lens drive device shown in FIG. 1 and FIG. 5(B) is the side view of the drive magnet.

In FIGS. 1, 2 and FIGS. 4(A) through 4(C), the drive mechanism includes a focusing drive coil 9, a pair of tracking drive coils 10 and a pair of tilt drive coils 11 which are respectively disposed on the base end side face 3a and the tip end side face 3b of the lens holder 3, holding parts 6b, 6c of the yoke 6, and a pair of drive magnets 12 held on the holding parts 6b, 6c so as to face the respective drive coils.

The focusing drive coil 9 is a flat wound type coil as shown in FIGS. 4(A) through 4(C). The focusing drive coil 9 is formed of a copper wire or an aluminum clad wire and wound around in a trapezoidal shape provided with oblique side parts. More concretely, the focusing drive coil 9 is wound around in an approximately laterally symmetrical trapezoidal shape which is provided with two oblique side parts 9a, 9a, an upper side part 9b that is a short side part, and a lower side part 9c that is a long side part. Especially, in the embodiment of the present invention, the focusing drive coil 9 is formed in an oblong trapezoidal shape in which the lower side part 9c is longer than the dimension in the height direction (upper and lower direction in FIG. 4(C)).

The tracking drive coil 10 is also a flat wound type coil and is formed of a copper wire or an aluminum clad wire and wound around in a trapezoidal shape provided with oblique side parts. More concretely, the tracking drive coil 10 is wound around in an approximately laterally symmetrical trapezoidal shape which is provided with two oblique side parts 10a, 10a, an upper side part 10b that is a short side part, and a lower side part 10c that is a long side part.

The tilt drive coil 11 is a flat wound type coil and is formed of a copper wire or an aluminum clad wire and wound around in an approximately rectangular shape. In the embodiment of the present invention, the tilt drive coil 11 is wound around in a rectangular shape provided with upper side parts 11a and lower side parts 11b in which their lengths are equal to each other.

The drive coils 9, 10 and 11 are constructed as described above. When an aluminum clad wire is used for the drive coils 9, 10 and 11, the weights of the respective drive coils can be reduced.

The pair of tilt drive coils 11 is fixed on each of the recessed part 3a1 of the base end side face 3a of the lens holder 3 and the recessed part 3b1 of the tip end side face 3b with an adhesive such that two tilt drive coils 11 are disposed side by side via a predetermined space in a horizontal direction in an approximately symmetrical manner. More concretely, the pair of tilt drive coils 11 is disposed such that the upper side part 11a and the lower side part 11b are extended to be parallel with each other in the horizontal direction in the drawing. The pair of tilt drive coils 11 is wound around so that their respective winding directions are different i.e., opposite and electrically connected in series each other. The recessed part 3a1 and the recessed part 3b1 are formed so as to be concaved slightly deeper than the thickness of the tilt drive coil 11. Therefore, when the tilt drive coils 11 are disposed in the recessed part 3a1 and the recessed part 3b1, the tilt drive coils 11 do not protrude from the base end side face 3a or the tip end side face 3b.

The focusing drive coils 9 are fixed on the base end side face 3a and the tip end side face 3b with an adhesive so as to cover the recessed part 3a1 and the recessed part 3b1. In other words, each of the focusing drive coils 9 is disposed on the base end side face 3a or the tip end side face 3b so as to overlap both the pair of tilt drive coils 11 in the opposing direction to the drive magnet 12 (see FIG. 1 and FIGS. 4(A)

through 4(C)). More concretely, the focusing drive coil 9 is disposed such that its upper side part 9b and lower side part 9c are extended to be parallel with each other in the horizontal direction in the drawing.

The pair of tracking drive coils 10 is disposed and fixed on the base end side face 3a and the tip end side face 3b with an adhesive at obliquely upward positions of the focusing drive coil 9. More concretely, the pair of tracking drive coils 10 is disposed in an approximately bilaterally symmetrical manner such that the respective oblique side parts 10a of the pair of tracking drive coils 10 and two oblique side parts 9a, 9a of the focusing drive coil 9 are located to be adjacent to each other in a roughly parallel manner on the base end side face 3a and the tip end side face 3b. A part of the tracking drive coil 10 covers a part of the recessed part 3a1 or a part of the recessed part 3b1 and thus overlaps a part of the tilt drive coil 11 in the opposed direction to the drive magnet 12.

The pair of drive magnets 12 is formed in a rectangular solid shape as shown in FIGS. 4(A) through 4(C) and FIGS. 5(A) and 5(B). The drive magnets 12 are held on the holding part 6b, 6c of the yoke 6 so as to interpose the lens holder 3 and face the base end side face 3a and the tip end side face 3b. The opposing face of the drive magnet 12 to the base end side face 3a or the tip end side face 3b of the lens holder 3, in other words, the opposing face to the focusing drive coil 9, the tracking drive coils 10 and the tilt drive coils 11 is formed to be a magnetized opposing face 12a which is polarized and magnetized with a magnetic pole dividing line 12b (magnetic pole boundary portion) in a roughly U-shape having vertical line parts 12b1, 12b1 and a horizontal line part 12b2 (see FIG. 5(B)). Concretely, the U-shaped portion of the magnetized opposing face 12a on the outside of the magnetic pole dividing line 12b is magnetized to an S-pole and the rectangular portion on the inner side of the magnetic pole dividing line 12b is magnetized to an N-pole. The drive magnet 12 is also polarized and magnetized in the thickness direction as shown in FIG. 5(A). In the embodiment of the present invention, the magnetic pole dividing line 12b is not required to be a complete U-shape and, for example, may be formed to include a roughly U-shaped portion having the vertical line parts 12b1, 12b1 and the horizontal line part 12b2.

Figure 6:
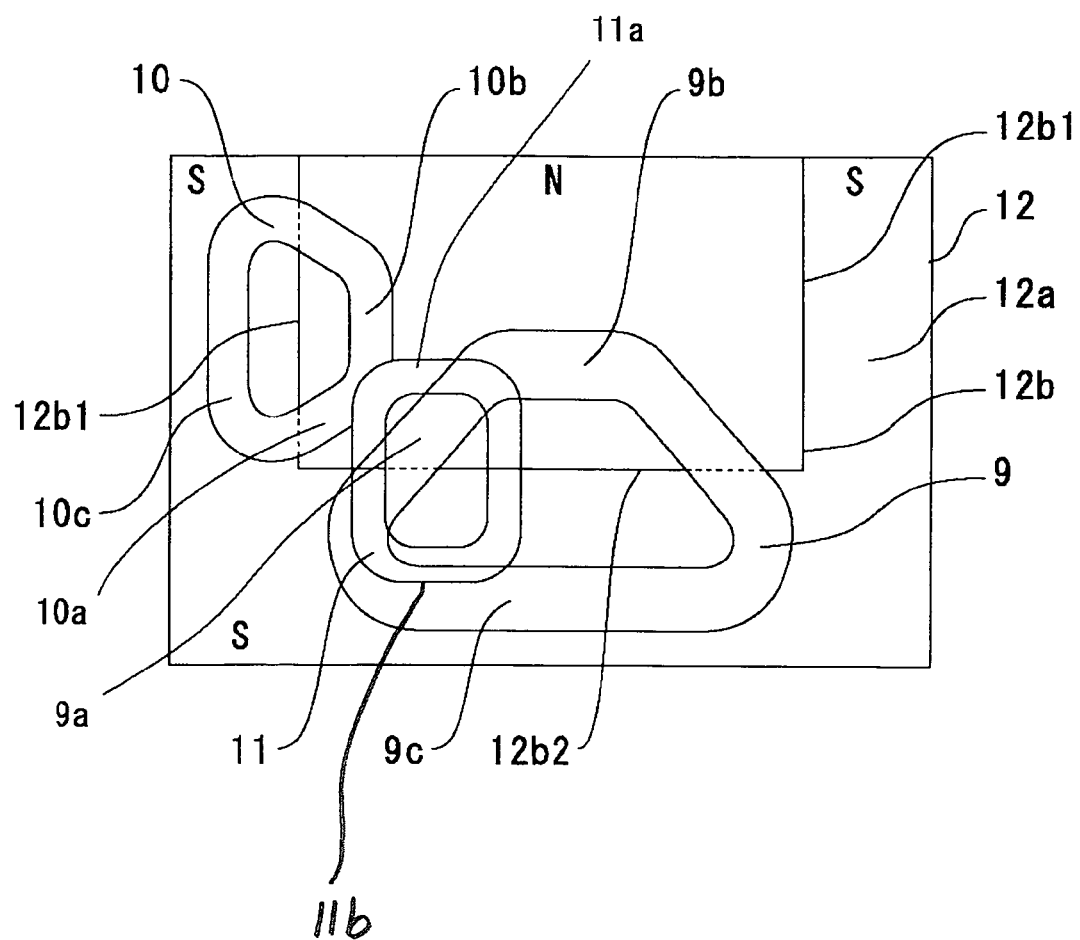
FIG. 6 is an explanatory view showing an arrangement relationship between the focusing drive coil, the tracking drive coil and the tilt drive coil and the drive magnet in the objective lens drive device shown in FIG. 1.

FIG. 6 is an explanatory view showing the relationship of opposed arrangement between the focusing drive coil, the tracking drive coil, and the tilt drive coil and the drive magnet. The pair of tracking drive coils 10 and the pair of tilt drive coils 11 are respectively disposed in an approximately bilaterally symmetrical manner and thus only one of the respective drive coils 10, 11 is illustrated and described in FIG. 6.

As shown in FIG. 6, the focusing drive coil 9 is disposed to oppose to the magnetized opposing face 12a of the drive magnet 12 so as to straddle and extend over the magnetic pole dividing line 12b. In the embodiment of the present invention, the focusing drive coil 9 is disposed so as to straddle and extend over the horizontal line part 12b2 of the magnetic pole dividing line 12b. More concretely, the focusing drive coil 9 is disposed such that the center line of the focusing drive coil 9 with respect to the vertical direction in the drawing approximately coincide with the horizontal line part 12b2 of the magnetic pole dividing line 12b. Therefore, the upper side part 9b and the lower side part 9c of the focusing drive coil 9 are respectively disposed to face different magnetic poles. Accordingly, two sides, i.e., the upper side part 9b and the lower side part 9c are capable of being used as an effective side at the time of focusing driving.

The pair of tracking drive coils 10 is also disposed to oppose to the magnetized opposing face 12a of the drive magnet 12 so as to straddle and extend over the magnetic pole dividing line 12b. In the embodiment of the present invention, the tracking drive coil 10 is disposed so as to straddle and extend over the vertical line part 12b1 of the magnetic pole dividing line 12b. More concretely, the tracking drive coil 10 is disposed such that the center line of the tracking drive coil 10 with respect to the horizontal direction in the drawing approximately coincide with the vertical line part 12b1 of the magnetic pole dividing line 12b. In other words, the upper side part 10b and the lower side part 10c of the tracking drive coil 10 are respectively disposed to face different magnetic poles. Therefore, two sides, i.e., the upper side part 10b and the lower side part 10c are capable of being used as an effective side at the time of tracking driving.

The pair of tilt drive coils 10 is also disposed to oppose to the magnetized opposing face 12a of the drive magnet 12 so as to straddle and extend over the magnetic pole dividing line 12b. In the embodiment of the present invention, the pair of tilt drive coils 11 is respectively disposed so as to straddle and extend over the horizontal line part 12b2 of the magnetic pole dividing line 12b. More concretely, the tilt drive coil 11 is disposed such that the center line of the tilt drive coil 11 with respect to the vertical direction in the drawing approximately coincide with the horizontal line part 12b2 of the magnetic pole dividing line 12b. In other words, the upper side part 11a and the lower side part 11b of the tilt drive coil 11 are respectively disposed to face different magnetic poles. Therefore, two sides, i.e., the upper side part 11a and the lower side part 11b are capable of being used as an effective side at the time of tilt driving.

As described above, in the objective lens drive device 1 in accordance with the embodiment of the present invention, the focusing drive coil 9, the pair of tracking drive coils 10 and the pair of tilt drive coils 11 are disposed so as to be opposed to the magnetized opposing face 12a of the drive magnet 12. Therefore, the focusing, tracking and tilt driving of the lens holder 3 can be performed by using a common drive magnet 12. Especially, in the embodiment of the present invention, the tilt drive coils 11 are opposedly disposed to the magnetized opposing face 12a so as to overlap with the focusing drive coil 9 and the tracking drive coils 10 in the opposing direction of the focusing drive coil 9 and the tracking drive coils 10 to the magnetized opposing face 12a. Accordingly, the concentrated arrangement of the respective drive coils on the lens holder 3 is enabled in the focusing direction "Fo" and the tracking direction "Tr". Consequently, the lens holder 3 can be made compact and the rigidity of the lens holder 3 can be enhanced. As a result, the high-order resonance frequency in the objective lens drive device 1 can be made a higher value.

Further, since the recessed part 3a1 and the recessed part 3b1 are concaved so they are slightly deeper than the thickness of the tilt drive coil 11, the tilt drive coils 11 are disposed on the inner side of the focusing drive coil 9 and the tracking drive coils 10 viewed from the drive magnet 12. Therefore, the tilt driving can be efficiently performed by using the common drive magnet 12.

In the embodiment of the present invention, the tilt drive coils 11 are respectively wound in a rectangular shape and disposed so as to be opposed to the magnetized opposing face 12a of the drive magnet 12 with straddling and extending over the magnetic pole dividing line 12b. Therefore, two sides that are the upper side part 10a and the lower side part 11b can be used for tilt driving. Therefore, the sensitivity of the objective lens 2 at the time of tilt driving can be enhanced. Similarly, the focusing drive coil 9 and the tracking drive coils 10 wound around in a trapezoidal shape are respectively disposed so as to be opposed to the magnetized opposing face 12a with straddling and extending over the magnetic pole dividing line 12b. Therefore, two sides that are the upper side part 9b and the lower side part 9c or the upper side part 10b and the lower side part 10c can be used for the focusing driving or the tracking driving, and thus the sensitivity of the objective lens 2 at the time of focusing driving or tracking driving can be enhanced.

In the embodiment of the present invention, the focusing drive coil 9 and the tracking drive coil 10 are respectively wound around in a trapezoidal shape having the oblique side part 9a or the oblique side part 10a. Further, the focusing drive coil 9 and the tracking drive coil 10 are disposed on the base end side face 3a and the tip end side face 3b such that the oblique side part 9a and the oblique side part 10a are adjacent and roughly parallel to each other. The focusing drive coil 9 and the tracking drive coils 10 are respectively disposed on the same face or plane, which is the base end side face 3a or the tip end side face 3b. Therefore, the concentrated arrangement of the focusing drive coil 9, the tracking drive coils 10 and the tilt drive coils 11 can be attained in the opposing direction to the magnetized opposing face 12a. Further, since the oblique side part 9a and the oblique side part 10a are disposed so that they are adjacent and roughly parallel to each other, the focusing drive coil 9 and the tracking drive coils 10 can be concentratedly disposed in the tracking direction "Tr". As a result, the rigidity of the lens holder 3 can be enhanced.

In the embodiment of the present invention, each of the focusing drive coil 9, the tracking drive coils 10 and the tilt drive coils 11 is a wound type coil. Therefore, the occupying volume rate of the coil can be enhanced in comparison with the case using a printed coil circuit board on which these drive coils are formed on a printed circuit board and thus a higher driving force can be obtained.

The present invention has been described in detail using the above-mentioned embodiment, but the present invention is not limited to the embodiment described above and many modifications can be made without departing from the present invention. For example, in the embodiment of the present invention, each of the focusing drive coil 9, the tracking drive coil 10 and the tilt drive coil 11 is a wound type coil. However, the respective drive coils may be formed on a printed circuit board in the above-mentioned shape.

Further, the respective drive coils of the focusing drive coil 9, the tracking drive coils 10 and the tilt drive coils 11 may be a wound type coil which is constructed by using, for example, a square shaped coil. In this case, the winding efficiency can be enhanced and thus the sensitivity of the objective lens 2 at the time of focusing driving can be furthermore improved.

In addition, in the embodiment of the present invention, the focusing drive coil 9, the pair of tracking drive coils 10 and the pair of tilt drive coils 11 are disposed on each of the base end side face 3a and the tip end side face 3b of the lens holder 3, and the pair of drive magnets 12 opposed to these drive coils is used. However, the respective drive coils are not required to be disposed on both faces of the base end side face 3a and the tip end side face 3b. In other words, the respective drive coils are disposed on either of the base end side face 3a and the tip end side face 3b and one drive magnet 12 may be disposed to face the drive coils.

Further, in the embodiment of the present invention, the tilt drive coils 11 are disposed so as to overlap with both of the focusing drive coil 9 and the tracking drive coils 10 in the opposing direction to the magnetized opposing face 12a of the drive magnet 12. However, the tilt drive coil 11 may be disposed so as to overlap with either one of the focusing drive coil 9 and the tracking drive coil 10 and, in this case, the lens holder 3 can be made compact in either one of the focusing direction "Fo" or the tracking direction "Tr".

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An objective lens drive device comprising:
   an objective lens;
   a lens holder which holds the objective lens;
   a fixed side member which supports the lens holder with a plurality of wires in a movable manner; and
   a drive mechanism for driving the lens holder at least in a focusing direction and a tracking direction, the drive mechanism comprising:
      a drive magnet provided with a magnetized opposing face in which different magnetic poles are disposed to be adjacent to each other via a magnetic pole boundary portion formed in a roughly U-shape;
      a focusing drive coil and a tracking drive coil which are opposedly disposed to the magnetized opposing face so as to extend over the magnetic pole boundary portion; and
      a tilt drive coil for driving the lens holder in a tilt direction, the tilt drive coil being opposedly disposed to the magnetized opposing face at a position where the tilt drive coil overlaps with at least the focusing drive coil or the tracking drive coil in a direction in which the focusing drive coil and the tracking drive coil face the magnetized opposing face;
   wherein the focusing drive coil and the tracking drive coil are respectively formed to be wound around in a roughly trapezoidal shape having a oblique side part and the focusing drive coil and the tracking drive coil are disposed on approximately the same plane such that both the oblique side parts are adjacent to each other.

2. An objective lens drive device comprising:
   an objective lens;
   a lens holder which holds the objective lens;
   a fixed side member which supports the lens holder with a plurality of wires in a movable manner; and
   a drive mechanism for driving the lens holder at least in a focusing direction and a tracking direction, the drive mechanism comprising:
      a drive magnet provided with a magnetized opposing face in which different magnetic poles are disposed to be adjacent to each other via a magnetic pole boundary portion formed in a roughly U-shape;
      a focusing drive coil and a tracking drive coil which are opposedly disposed to the magnetized opposing face so as to extend over the magnetic pole boundary portion; and
      a tilt drive coil for driving the lens holder in a tilt direction, the tilt drive coil being opposedly disposed to the magnetized opposing face at a position where the tilt drive coil overlaps with at least the focusing drive coil or the tracking drive coil in a direction in which the focusing drive coil and the tracking drive coil face the magnetized opposing face;
   wherein the focusing drive coil and the tracking drive coil are respectively formed to be wound around in a roughly trapezoidal shape having a short side part, a long side part and an oblique side part that connects the long side part with the short side part, and the focusing drive coil and the tracking drive coil are disposed on approximately the same plane and disposed such that the long side part of the focusing drive coil is perpendicular to the long side part of the tracking drive coil.

3. An objective lens drive device comprising:
an objective lens;
a lens holder which holds the objective lens;
a fixed side member which supports the lens holder with a plurality of wires in a movable manner;
a drive mechanism for driving the lens holder at least in a focusing direction and a tracking direction, the drive mechanism comprising;
  a drive magnet provided with a magnetized opposing face in which different magnetic poles are disposed to be adjacent to each other via a magnetic pole boundary portion formed in a roughly U-shape;
  a focusing drive coil and a tracking drive coil which are opposedly disposed to the magnetized opposing face so as to extend over the magnetic pole boundary portion; and
  a tilt drive coil for driving the lens holder in a tilt direction, the tilt drive coil being opposedly disposed to the magnetized opposing face at a position where the tilt drive coil overlaps with at least the focusing drive coil or the tracking drive coil in a direction in which the focusing drive coil and the tracking drive coil face the magnetized opposing face; and
a recessed part provided on a side face of the lens holder for disposing the tilt drive coil; wherein the focusing drive coil is disposed over the recessed part so as to overlap with the tilt drive coil; and
wherein the focusing drive coil and the tracking drive coil are respectively formed to be wound around in a roughly trapezoidal shape having a short side part, a long side part and an oblique side part that connects the long side part to the short side part, and the focusing drive coil and the tracking drive coil are disposed on approximately the same plane and disposed such that the long side part of the focusing drive coil becomes perpendicular to the long side part of the tracking drive coil.

4. The objective lens drive device according to claim 3, wherein the recessed part on which the tilt drive coil is disposed is formed on both sides of a base end side face and a tip end side face of the lens holder, and the tilt drive coil, the focusing drive coil and the tracking drive coil are respectively disposed on both the base end side face and the tip end side face of the lens holder.

5. An objective lens drive device comprising:
an objective lens;
a lens holder that holds the objective lens;
a fixed side member that supports the lens holder with a plurality of wires in a movable manner; and
a drive mechanism for driving the lens holder at least in a focusing direction and a tracking direction, the drive mechanism comprising:
  a drive magnet having a magnetized opposing face in which different magnetic poles are disposed to be adjacent to each other via a magnetic pole boundary portion formed in an approximate U-shape;
  a focusing drive coil and a tracking drive coil that are opposedly disposed to the magnetized opposing face so as to extend over the magnetic pole boundary portion; and
  a tilt drive coil for driving the lens holder in a tilt direction;
wherein the focusing drive coil and the tracking drive coil are respectively formed to be wound around in an approximate trapezoidal shape having an oblique side part and the focusing drive coil and the tracking drive coil are disposed on approximately the same plane such that both the oblique side parts are adjacent to each other.

6. An objective lens drive device comprising:
an objective lens;
a lens holder that holds the objective lens;
a fixed side member that supports the lens holder with a plurality of wires in a movable manner; and
a drive mechanism for driving the lens holder at least in a focusing direction and a tracking direction, the drive mechanism comprising:
  a drive magnet having a magnetized opposing face in which different magnetic poles are disposed to be adjacent to each other via a magnetic pole boundary portion formed in an approximate U-shape;
  a focusing drive coil and a tracking drive coil that are opposedly disposed to the magnetized opposing face so as to extend over the magnetic pole boundary portion; and
  a tilt drive coil for driving the lens holder in a tilt direction;
wherein the focusing drive coil and the tracking drive coil are respectively formed to be wound around in an approximate trapezoidal shape having a short side part, a long side part and an oblique side part that connects the long side part with the short side part, and the focusing drive coil and the tracking drive coil are disposed on approximately the same plane such that the long side part of the focusing drive coil is perpendicular to the long side part of the tracking drive coil.

7. An objective lens drive device comprising:
an objective lens;
a lens holder that holds the objective lens;
a fixed side member that supports the lens holder with a plurality of wires in a movable manner; and
a drive mechanism for driving the lens holder at least in a focusing direction and a tracking direction, the drive mechanism comprising:
  a drive magnet having a magnetized opposing face in which different magnetic poles are disposed to be adjacent to each other via a magnetic pole boundary portion formed in an approximate U-shape;
  a focusing drive coil and a tracking drive coil that are opposedly disposed to the magnetized opposing face so as to extend over the magnetic pole boundary portion; and
  a tilt drive coil for driving the lens holder in a tilt direction; and
a recessed part provided on a side face of the lens holder for disposing the tilt drive coil;
wherein the focusing drive coil is disposed over the recessed part so as to overlap with the tilt drive coil;
wherein the tilt drive coil is opposedly disposed to the magnetized opposing face at a position where the tilt drive coil overlaps with at least the focusing drive coil or the tracking drive coil in a direction in which the focusing drive coil and the tracking drive coil face the magnetized opposing face; and
wherein the focusing drive coil and the tracking drive coil are respectively formed to be wound around in an approximate trapezoidal shape having a short side part, a long side part and an oblique side part that connects the long side part to the short side part, and the focusing drive coil and the tracking drive coil are disposed on approximately the same plane and disposed such that the long side part of the focusing drive coil is perpendicular to the long side part of the tracking drive coil.

8. The objective lens drive device according to claim 7, wherein the recessed part on which the tilt drive coil is disposed is formed on both sides of a base end side face and a tip end side face of the lens holder, and the tilt drive coil, the focusing drive coil and the tracking drive coil are respectively disposed on both the base end side face and the tip end side face of the lens holder.

9. An optical head device comprising:
an objective lens drive device comprising:
an objective lens;
a lens holder which holds the objective lens;
a fixed side member which supports the lens holder with a plurality of wires in a movable manner; and
a drive mechanism for driving the lens holder at least in a focusing direction and a tracking direction, the drive mechanism comprising:
a drive magnet provided with a magnetized opposing face in which different magnetic poles are disposed to be adjacent to each other via a magnetic pole boundary portion formed in a roughly U-shape;
a focusing drive coil and a tracking drive coil which are opposedly disposed to the magnetized opposing face so as to extend over the magnetic pole boundary portion; and
a tilt drive coil for driving the lens holder in a tilt direction, the tilt drive coil being opposedly disposed to the magnetized opposing face at a position where the tilt drive coil overlaps with at least the focusing drive coil or the tracking drive coil in a direction in which the focusing drive coil and the tracking drive coil face the magnetized opposing face;
wherein the focusing drive coil and the tracking drive coil are respectively formed to be wound around in a roughly trapezoidal shape having a oblique side part and the focusing drive coil and the tracking drive coil are disposed on approximately the same plane such that both the oblique side parts are adjacent to each other.

10. An optical head device comprising:
an objective lens drive device comprising:
an objective lens;
a lens holder which holds the objective lens;
a fixed side member which supports the lens holder with a plurality of wires in a movable manner; and
a drive mechanism for driving the lens holder at least in a focusing direction and a tracking direction, the drive mechanism comprising:
a drive magnet provided with a magnetized opposing face in which different magnetic poles are disposed to be adjacent to each other via a magnetic pole boundary portion formed in a roughly U-shape;
a focusing drive coil and a tracking drive coil which are opposedly disposed to the magnetized opposing face so as to extend over the magnetic pole boundary portion; and
a tilt drive coil for driving the lens holder in a tilt direction, the tilt drive coil being opposedly disposed to the magnetized opposing face at a position where the tilt drive coil overlaps with at least the focusing drive coil or the tracking drive coil in a direction in which the focusing drive coil and the tracking drive coil face the magnetized opposing face;
wherein the focusing drive coil and the tracking drive coil are respectively formed to be wound around in a roughly trapezoidal shape having a short side part, a long side part and an oblique side part that connects the long side part with the short side part, and the focusing drive coil and the tracking drive coil are disposed on approximately the same plane and disposed such that the long side part of the focusing drive coil is perpendicular to the long side part of the tracking drive coil.

11. An optical head device comprising:
an objective lens drive device comprising:
an objective lens;
a lens holder which holds the objective lens;
a fixed side member which supports the lens holder with a plurality of wires in a movable manner;
a drive mechanism for driving the lens holder at least in a focusing direction and a tracking direction, the drive mechanism comprising:
a drive magnet provided with a magnetized opposing face in which different magnetic poles are disposed to be adjacent to each other via a magnetic pole boundary portion formed in a roughly U-shape;
a focusing drive coil and a tracking drive coil which are opposedly disposed to the magnetized opposing face so as to extend over the magnetic pole boundary portion; and
a tilt drive coil for driving the lens holder in a tilt direction, the tilt drive coil being opposedly disposed to the magnetized opposing face at a position where the tilt drive coil overlaps with at least the focusing drive coil or the tracking drive coil in a direction in which the focusing drive coil and the tracking drive coil face the magnetized opposing face; and
a recessed part provided on a side face of the lens holder for disposing the tilt drive coil;
wherein the focusing drive coil is disposed over the recessed part so as to overlap with the tilt drive coil; and
wherein the focusing drive coil and the tracking drive coil are respectively formed to be wound around in a roughly trapezoidal shape having a short side part, a long side part and an oblique side part that connects the long side part to the short side part, and the focusing drive coil and the tracking drive coil are disposed on approximately the same plane and disposed such that the long side part of the focusing drive coil becomes perpendicular to the long side part of the tracking drive coil.

12. The optical head device according to claim 11, wherein the recessed part on which the tilt drive coil is disposed is formed on both sides of a base end side face and a tip end side face of the lens holder, and the tilt drive coil, the focusing drive coil and the tracking drive coil are respectively disposed on both the base end side face and the tip end side face of the lens holder.

13. An optical head device comprising:
an objective lens drive device comprising:
an objective lens;
a lens holder that holds the objective lens;
a fixed side member that supports the lens holder with a plurality of wires in a movable manner; and a drive mechanism for driving the lens holder at least in a focusing direction and a tracking direction, the drive mechanism comprising:
- a drive magnet having a magnetized opposing face in which different magnetic poles are disposed to be adjacent to each other via a magnetic pole boundary portion formed in an approximate U-shape;
- a focusing drive coil and a tracking drive coil that are opposedly disposed to the magnetized opposing face so as to extend over the magnetic pole boundary portion; and
- a tilt drive coil for driving the lens holder in a tilt direction;

wherein the focusing drive coil and the tracking drive coil are respectively formed to be wound around in an approximate trapezoidal shape having an oblique side part and the focusing drive coil and the tracking drive coil are disposed on approximately the same plane such that both the oblique side parts are adjacent to each other.

14. An optical head device comprising:
an objective lens drive device comprising:
- an objective lens;
- a lens holder that holds the objective lens;
- a fixed side member that supports the lens holder with a plurality of wires in a movable manner; and
- a drive mechanism for driving the lens holder at least in a focusing direction and a tracking direction, the drive mechanism comprising:
  - a drive magnet having a magnetized opposing face in which different magnetic poles are disposed to be adjacent to each other via a magnetic pole boundary portion formed in an approximate U-shape;
  - a focusing drive coil and a tracking drive coil that are opposedly disposed to the magnetized opposing face so as to extend over the magnetic pole boundary portion; and
  - a tilt drive coil for driving the lens holder in a tilt direction;

wherein the focusing drive coil and the tracking drive coil are respectively formed to be wound around in an approximate trapezoidal shape having a short side part, a long side part and an oblique side part that connects the long side part with the short side part, and the focusing drive coil and the tracking drive coil are disposed on approximately the same plane such that the long side part of the focusing drive coil is perpendicular to the long side part of the tracking drive coil.

15. An optical head device comprising:
an objective lens drive device comprising:
- an objective lens;
- a lens holder that holds the objective lens;
- a fixed side member that supports the lens holder with a plurality of wires in a movable manner; and
- a drive mechanism for driving the lens holder at least in a focusing direction and a tracking direction, the drive mechanism comprising:
  - a drive magnet having a magnetized opposing face in which different magnetic poles are disposed to be adjacent to each other via a magnetic pole boundary portion formed in an approximate U-shape;
  - a focusing drive coil and a tracking drive coil that are opposedly disposed to the magnetized opposing face so as to extend over the magnetic pole boundary portion; and
  - a tilt drive coil for driving the lens holder in a tilt direction; and
- a recessed part provided on a side face of the lens holder for disposing the tilt drive coil;

wherein the focusing drive coil is disposed over the recessed part so as to overlap with the tilt drive coil;

wherein the tilt drive coil is opposedly disposed to the magnetized opposing face at a position where the tilt drive coil overlaps with at least the focusing drive coil or the tracking drive coil in a direction in which the focusing drive coil and the tracking drive coil face the magnetized opposing face; and wherein the focusing drive coil and the tracking drive coil are respectively formed to be wound around in an approximate trapezoidal shape having a short side part, a long side part and an oblique side part that connects the long side part to the short side part, and the focusing drive coil and the tracking drive coil are disposed on approximately the same plane and disposed such that the long side part of the focusing drive coil is perpendicular to the long side part of the tracking drive coil.

16. The optical head device according to claim 15, wherein the recessed part on which the tilt drive coil is disposed is formed on both sides of a base end side face and a tip end side face of the lens holder, and the tilt drive coil, the focusing drive coil and the tracking drive coil are respectively disposed on both the base end side face and the tip end side face of the lens holder.

* * * * *